Patented Feb. 27, 1945

2,370,552

UNITED STATES PATENT OFFICE 2,370,552

METHOD OF INHIBITING DETERIORATION OF ORGANIC COMPOUNDS

Bert H. Lincoln and Clarence A. Neilson, Ponca City, Okla., assignors to Continental Oil Company, Ponca City, Okla., a corporation of Delaware No Drawing. Application March 20, 1941, Serial No. 384,414

6 Claims. (Cl. 260—648)

This invention relates to a method of protecting and inhibiting organic compounds against discoloration or other deleterious changes during the process of halogenation in the manufacture of halogenated organic compounds. The invention applies particularly to the halogenation of organic compounds carried out in ferrous equipment or equipment having iron exposed to the reaction mixture. When dry organic compounds are halogenated at elevated temperatures in glass equipment, the color of the organic compounds remains practically unchanged throughout the process, or is not substantially darker than the hologen bearing compound should be. In the presence of traces of water and iron or iron chlorides, however, the color immediately darkens to a black and may undergo other objectionable changes in a short period of time. Such materials are useless in their changed state, and restoration to their original condition may be impossible or at least very difficult and expensive.

One object of our invention is to provide a method of avoiding the deterioration of organic materials during halogenation.

Another object of our invention is to prevent the discoloration of organic compounds by halogenation in the presence of water and iron or iron compounds.

A further object of our invention is to provide a method of obtaining improved halogenated materials in ferrous equipment.

Other objects and advantages will appear in the course of the following description.

We have found that the addition of a small amount of various basic nitrogenous organic compounds to the material undergoing halogenation will greatly inhibit or entirely prevent the deterioration of the organic materials although large quantities of moisture, iron, and iron chlorides are present.

It is preferable to add the nitrogenous organic compounds before the halogenating process is started. These basic nitrogenous compounds are of the general formula

where R may be an alkyl, alkylol, aryl, aralkyl, hydroaryl, or heterocyclic radicals and R' and R'' may be hydrogen, hydroxyl, alkyl, alkylol, aryl, aralkyl, hydroaryl, or heterocyclic radicals. These amines may be either oil or water-soluble. Heterocyclic nitrogen compounds are also suitable. Specific examples of the amines which may be used are:

I. Aliphatic amines
1. Amylamine
2. Diamylamine
3. Triamylamine
4. Tributylamine
5. Cetylamine
6. Ethanolamine
7. Diethanolamine
8. Triethanolamine
9. Propanolamine
10. Ethylenediamine
11. Propylenediamine
12. Diethylenetriamine
13. Triethylenetetramine
14. Tetraethylenepentamine II. Aromatic amines
1. Aniline
2. Methylaniline
3. Dimethylaniline
4. Diamylaniline
5. Toluidine
6. Xylidine
7. Diphenylamine
8. Triphenylamine
9. Nitraniline
10. Phenylene diamine
11. Aminophenol
12. Aminodiphenyl
13. Benzidine
14. Benzamide
15. Acetanilide
16. Acet-toluidide
17. Acetoacetanilide III. Heterocylic amines and nitrogen bases
1. Pyridine
2. Pyrrol
3. Pyrrolidine
4. Piperidine
5. Lutidine
6. Aminobenzofurane
7. Morpholine
8. Benzimidazol
9. Carbazol
10. Nicotinic acid
11. Picoline
12. Brucine Any of the above or mixtures of the above or various oxygen, halogen, nitrogen, sulfur, or phosphorus derivatives of these compounds may be used within the scope of our invention.

About 0.05 to 1 or 2 per cent of the amines are added, based on the amount of material to be halogenated. Some of the more effective nitrogen compounds, however, may be required in smaller amounts and we may use as much as 5 or 10 per cent of some of the amines.

The following examples of applications of our invention are intended to be illustrative only and are not to be construed as limitations.

Example 1

A waxy hydrocarbon oil prepared from a crude oil, in contact with rusty iron and containing about 1 per cent water and about 0.5 per cent ferric chloride, and the same oil containing (1) 0.5 per cent of a mixture of butyl and amyl amines, (2) 0.75 per cent of a mixture of butyl and amyl amines, and (3) 3.00 per cent of a mixture of butyl and amyl amines were chlorinated to 10 per cent chlorine content at 250° F. The control sample without amines blackened in about ten minutes, but the other samples were heated for one and a half hours at 250° F., after which their true colors were determined with the following results:

| Oil sample | True color after 1.5 hours at 250° F. |
|---|---|
| Control | Black (above 1,000). |
| Control+0.5% mixed amines | 79. |
| Control+0.75% mixed amines | 2.2. |
| Control+3.00% mixed amines | 1.5. |

Example 2

A more severe test was applied in another example in which there was iron both in that portion of the container holding the liquid material being halogenated, and the vapor space above. The waxy hydrocarbon oil with 1 per cent of water, 0.5 per cent ferric chloride, and a rusty piece of iron extending from the liquid up into the vapor phase and the same oil with (1) 1 per cent of mixed butyl and amyl amines and (2) 2 per cent of mixed butyl and amyl amines were chlorinated to 10 per cent chlorine content at 250° C. The true colors were then determined with the following results:

| Oil sample | True color after chlorination |
|---|---|
| Control | Black |
| Control+1% mixed amines | 5.0 |
| Control+2% mixed amines | 3.5 |

Example 3

Similar results were obtained when the same experiments were repeated using triethanolamine instead of the mixed amines.

Example 4

In chlorinating a batch of methyl stearate, a small drop of a water solution of iron chloride was introduced into the chlorinating mixture due to the use of a ferrous chlorine line. The chlorinating mixture immediately turned black (the true color above 900) and the batch was therefore ruined. The same operation was repeated with the exception of the introduction of .5 per cent of triethanolamine into the methyl stearate being chlorinated, and then repeated introductions of small amounts of water solution of iron chloride had no effect on the color.

Example 5

Upon chlorinating stearic acid in ferrous equipment, the product became extremely black when less than 4 per cent of chlorine had been introduced into the stearic acid. Repeating the experiment but introducing .5 per cent of diethanolamine in the stearic acid permitted chlorinating the stearic acid to approximately 17 per cent total chlorine content, with a finished true color of 3.

Example 6

Upon chlorinating diphenyl-oxide in ferrous equipment, the product darkened to a true color of approximately 500. Repeating the experiment but using .5 per cent of triamylamine based upon a total weight of diphenyloxide, we were able to chlorinate the material to a chlorine content of 20 per cent, with a finished true color of 4.

After chlorination, the oils are washed with a dilute solution of sodium carbonate to remove free hydrochloric acid. This treatment also serves to remove the amine hydrochlorides and any remaining free amines.

The efficacy of the amines in preserving the color of hydrocarbon oils during chlorination is probably due in part to their being adsorbed on exposed iron surfaces and thereby inhibiting the action of hydrochloric acid on the iron, tending to form ferric chloride. Evidently the color deterioration of the waxy hydrocarbon oils is associated with the formation of iron chlorides, for such oils chlorinated in the presence of iron chlorides without amines rapidly lose color.

In addition to the foregoing, the amines have another very desirable property of preventing color increase in organic compounds being chlorinated when iron chloride as such is known to be present. We do not know why the amines are still effective in preserving color in the presence of iron chloride, but broad experience has taught us that the amines inhibit some color-forming reaction.

The addition of amines to waxy hydrocarbon oils during chlorination therefore serves the double purpose of inhibiting the attack of hydrochloric acid on the iron reaction vessels and thereby prevents color loss by the oils undergoing chlorination.

Speculations and theories as to the reason for the results obtained are but conjectures as to what probably occurs, and we do not wish to be bound by them except in so far as they are compatible with the truth.

While chlorine and chlorination are specifically referred to, we contemplate the application of our invention in all halogenation processes, regardless of the halogen employed. Brominations, particularly, as well as fluorinations and iodinations may be subjected to the improvements of our invention.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, we claim:

1. A method of preventing discoloration of hydrocarbon materials during halogenation thereof in the presence of moisture and iron or iron compounds, comprising halogenating the hydrocarbon material in the presence of a basic nitrogenous organic compound.

2. A method of preventing discoloration of hydrocarbon materials during halogenation thereof in the presence of moisture and iron or iron compounds, comprising halogenating the hydrocarbon materials in the presence of a minor quantity of a basic nitrogenous organic compound.

3. A method of preventing discoloration of hydrocarbon materials during halogenation thereof in the presence of moisture and iron or iron compounds, comprising halogenating the hydrocarbon materials in the presence of from 0.1 per cent to 10 per cent of a basic nitrogenous organic compound.

4. A method of preventing discoloration of hydrocarbon materials during halogenation thereof in the presence of moisture and iron or iron compounds, comprising halogenating the hydrocarbon materials in the presence of a minor quantity of an amine.

5. A method of preventing discoloration of hydrocarbon materials during halogenation thereof in the presence of moisture and iron or iron compounds, comprising halogenating the hydrocarbon materials in the presence of from 0.1 per cent to 10 per cent of an amine.

6. A method of preventing discoloration of hydrocarbon materials during halogenation thereof in the presence of moisture and iron or iron compounds, comprising halogenating the hydrocarbon materials in the presence of a minor quantity of an aliphatic amine.

BERT H. LINCOLN.
CLARENCE A. NEILSON.